Patented June 18, 1940

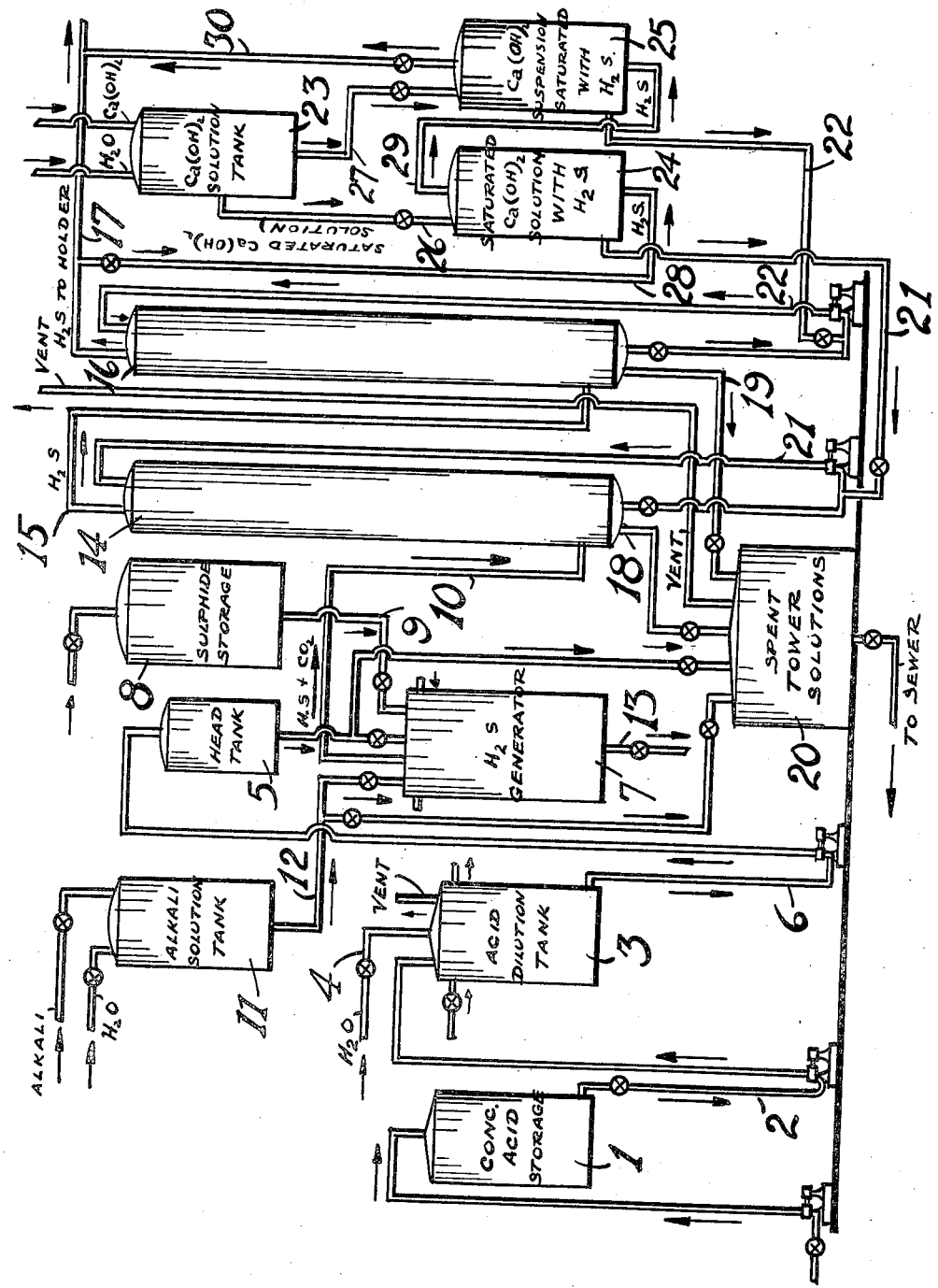

2,205,122

UNITED STATES PATENT OFFICE 2,205,122

PURIFICATION OF GASES

Sylvester Alton Le Croy, Baton Rouge, La., assignor to Standard Oil Development Company, a corporation of Delaware Application October 12, 1937, Serial No. 168,532

1 Claim. (Cl. 23—181)

This invention relates to the purification of gases. It is concerned with the removal of carbon dioxide from a gaseous hydrogen sulfide-carbon dioxide mixture. The invention especially relates to the separation of carbon dioxide from hydrogen sulfide by means of a calcium hydroxide solution when said hydrogen sulfide is secured by treating a crude metallic sulfide, containing mixed carbonates as impurities, with a mineral acid.

It is known to commercially prepare hydrogen sulfide by treating crude metallic sulfide as, for example, sodium hydrosulfide, containing mixed carbonates as impurities, with a mineral acid. The hydrogen sulfide gas secured in this process contains carbon dioxide which is formed from the reaction of the acid on the carbonates. For most operations, the presence of carbon dioxide in the hydrogen sulfide does not necessarily impair the subsequent use of the hydrogen sulfide. However, in other operations when the hydrogen sulfide is utilized for certain purposes, as for example in the manufacture of sensitive catalytic material, it is imperative that the carbon dioxide be completely removed in an economical manner.

The present invention uses a solution of calcium hydroxide to purify the hydrogen sulfide and remove the undesirable carbon dioxide in a manner as may be readily understood by reference to the attached drawing illustrating one modification of the invention. Concentrated mineral acid is led from the acid storage tank 1 by means of line 2 into acid dilution tank 3 where the acid may be diluted to the strength desired by introducing water through line 4. This tank may be suitably equipped with venting, cooling or refrigerating and agitating means. The diluted acid is then led into an overhead feed tank 5 by means of line 6 from which tank the acid is led at the desired rate into the hydrogen sulfide generator 7. The metallic sulfide, containing as impurities mixed carbonates, is introduced into the hydrogen sulfide generator 7 from storage tank 8 by means of line 9. The evolved hydrogen sulfide, containing as impurities carbon dioxide, is taken overhead from the hydrogen sulfide generator by means of line 10. The spent reaction products in the hydrogen sulfide generator 7 are neutralized with an alkali solution from tank 11 introduced through line 12. The spent neutralized products are withdrawn by means of line 13.

The hydrogen sulfide-carbon dioxide gaseous mixture is led into the bottom of the scrubbing tower 14 by means of line 10. The gases rises through the tower encountering a counter-flowing saturated calcium hydroxide solution which has previously been saturated with hydrogen sulfide. The scrubbed gases are taken overhead by means of line 15 and introduced into the bottom of scrubbing tower 16 where they flow upwardly and are scrubbed with a countercurrent flowing saturated calcium hydroxide solution containing a suspension of calcium hydroxide, said solution being previously saturated with hydrogen sulfide. The hydrogen sulfide scrubbed gases free from carbon dioxide are taken overhead by means of line 17 and led to a suitable storage tank or gas holder. The spent calcium hydroxide solutions containing the carbon dioxide are withdrawn from the bottom of gas scrubbing towers 14 and 16 by means of lines 18 and 19 and are led into tank 20 where they may be further treated or discarded. Gas scrubbing towers 14 and 16 may contain suitable contacting and distributing means as, for example, bubble plates or contact masses. These towers are also equipped with recycling means whereby the calcium hydroxide solutions from the bottom of the towers may be introduced into the calcium hydroxide feed lines 21 and 22 through which the calcium hydroxide solutions are introduced into the top of the scrubbing towers. The fresh saturated calcium hydroxide scrubbing solution containing a suspension of calcium hydroxide is stored in storage tank 23 from which it may be led into the hydrogen sulfide saturating tanks 24 and 25. The calcium hydroxide solution led into tank 24 is preferably taken from approximately the center of tank 23 by means of line 26. The calcium hydroxide solution contained in tank 25 is taken from the bottom of tank 23 by means of line 27 and therefore contains a calcium hydroxide suspension. The calcium hydroxide solution from tank 24 is used in the first scrubbing tower 14 while the calcium hydroxide solution containing a suspension of calcium hydroxide is used in the separate scrubbing tower 16. The calcium hydroxide saturated solution contained in tanks 24 and 25 are saturated with hydrogen sulfide by means of hydrogen sulfide taken from line 17 and introduced into these solutions by means of lines 28 and 29. The excess hydrogen sulfide is returned to line 17 by means of line 30.

The operation may be widely modified with respect to operating conditions and the flow of gases and liquids. One generator or more may be employed and the evolved gases treated either in a series or parallel operation. Although it is preferred to use two scrubbing towers through which the gases flow in series and to introduce into the first scrubbing tower a saturated calcium hydroxide solution and to introduce into the second tower a saturated calcium hydroxide solution containing a suspension of calcium hydroxide, this operation may also be widely varied. More or less gas scrubbing towers may be used and the gas flow may be either series or parallel or a combination of these. The calcium hydroxide solution may be of the same strength and need not contain a suspension of calcium hydroxide. Although it is preferable to completely saturate the saturated calcium hydroxide solutions with hydrogen sulfide before introducing these solutions into the scrubbing towers, this is not absolutely necessary under certain conditions and the calcium hydroxide solution may be introduced directly into the scrubbing towers without being saturated with hydrogen sulfide.

The concentration of the sulphuric acid used in the gas generator is in the range from 30% to 50%, preferably having a concentration of 40%. The concentration of calcium hydroxide used is in the range from 0.1% to approximately a 6.0% suspension, preferably having a concentration of 3.0%. The temperature of the calcium hydroxide solution is in the range of from 32° F. to 125° F., preferably about 70° F. The desirable pressure in the gas purifying towers is slightly above atmospheric pressure although higher pressure may be employed.

A preferred method of purifying the hydrogen sulfide gas from carbon dioxide is to first lead the gases into an initial gas scrubber through which a relatively weak calcium hydroxide solution having a concentration of about 0.2% is circulated and then to lead the exist gases from this purifier into a subsequent purifier through which a relatively strong calcium hydroxide solution is circulated, preferably of a concentration of about 3.0%, both solutions being at a temperature of about 70° F.

One method of conducting the process as applied to the attached drawing is given in the following example:

Example 1

Concentrated sulphuric acid from storage tank 1 is led into storage tank 3 by means of line 2 and diluted to approximately 40% concentration. This diluted acid is led into the gas generator 7 where it contacts the solution of crude sodium hydrosulfide containing as impurities mixed carbonates. Evolved hydrogen sulfide and carbon dioxide gases are taken overhead by line 10 and led into the lower part of tower 14. The spent reaction mixture in the generator 7 is neutralized with a 5% sodium hydroxide solution from alkali tank 11 and is then withdrawn from the generator 7 through line 13. The hydrogen sulfide-carbon dioxide gaseous mixture led into the lower section of tower 14 flows upwardly intimately contacting counter-flowing saturated calcium hydroxide solution of about 0.2% concentration. The scrubbed gas from tower 14 is then led into the lower section of tower 16 where it flows upwardly intimately contacting counter-flowing saturated calcium hydroxide containing a 3% suspension of calcium hydroxide. The hydrogen sulfide gas free of carbon dioxide is then taken overhead by means of line 17 and led to a suitable gas holder. The scrubbing calcium hydroxide solutions used in towers 14 and 16 are previously saturated with hydrogen sulfide in saturating tanks 24 and 25 by means of hydrogen sulfide led from line 17.

Example 2

650 parts by volume of saturated calcium hydroxide containing approximately 3.0% of calcium hydroxide as a suspension was saturated with hydrogen sulfide. This solution saturated with hydrogen sulfide was led into 3 scrubbing units connected in series. A mixture of 1500 parts by volume of hydrogen sulfide and 500 parts of carbon dioxide was passed through the solutions maintained at a temperature of about 60° F. and at about atmospheric pressure. Approximately 1500 parts by volume of exit gas was collected which was then passed through a solution of cadmium acetate in order to determine the presence or absence of carbon dioxide. The entire volume of the exit gas was absorbed in the cadmium acetate signifying the complete absence of carbon dioxide in the hydrogen sulfide gas evolved from the calcium hydroxide solutions.

In processes where the hydrogen sulfide gases containing carbon dioxide are first led into calcium hydroxide solutions which have not been previously saturated with hydrogen sulfide, the solution will take up both the carbon dioxide and hydrogen sulfide until a point of saturation is reached with respect to the hydrogen sulfide. At this point, secondary reactions occur and thereafter the hydrogen sulfide quantitatively passes through the hydrogen sulfide solutions and the carbon dioxide is absorbed. Thus it is within the scope of this invention to separate carbon dioxide from a gaseous hydrogen sulfide-carbon dioxide mixture with a calcium hydroxide solution which has not previously been in contact with or saturated with hydrogen sulfide.

A desirable application of the present invention is in the process of manufacturing hydrogen from sulphur containing hydrocarbon gases by reacting said hydrocarbon gases with steam. In this process the hydrogen sulfide and carbon dioxide are removed from the hydrogen by means of scrubbing with substances such as amino alcohols as, for example, triethanolamine. The amino solution is reacted by driving off the absorbed carbon dioxide and hydrogen sulfide. Thus these gases could be readily scrubbed with calcium hydroxide in accordance with the present invention to produce a hydrogen sulfide gas free from carbon dioxide which would be suitable for the manufacture of sensitive catalytic materials.

The invention is not to be limited by any theory or method of operation but only by the following claim in which it is desired to claim all novelty in so far as the prior art permits.

I claim:

A continuous process of preparing pure hydrogen sulfide from a gas mixture of hydrogen sulfide and carbon dioxide which comprises continuously contacting said gas mixture in an initial countercurrent scrubbing zone with an aqueous 0.2% calcium hydroxide solution saturated with hydrogen sulfide, removing the scrubbed gases from the initial scrubbing zone and re-scrubbing the same in a second countercurrent scrubbing zone with an aqueous 3.0% suspension of calcium hydroxide saturated with hydrogen sulfide, continuously saturating new portions of said calcium hydroxide solution and suspension with a part of the hydrogen sulfide purified in the manner described, and employing the calcium hydroxide solution and suspension thus treated in the scrubbing of further portions of the said mixture of hydrogen sulfide and carbon dioxide.

SYLVESTER ALTON LE CROY.